(12) United States Patent
Owen et al.

(10) Patent No.: US 6,695,688 B1
(45) Date of Patent: Feb. 24, 2004

(54) "TREE WINCH" PORTABLE GAME HOIST

(76) Inventors: James Edward Owen, 115 Lakeview Ct., Fayetteville, GA (US) 30214; Alva Eugene Owen, 161 Yorkshire Pl., Newnan, GA (US) 30265

( * ) Notice: Subject to any disclaimer, the term of this patent is extended or adjusted under 35 U.S.C. 154(b) by 0 days.

(21) Appl. No.: 10/379,479

(22) Filed: Mar. 4, 2003

Related U.S. Application Data

(60) Provisional application No. 60/423,124, filed on Nov. 1, 2002.

(51) Int. Cl.[7] .................................................. A22B 5/00
(52) U.S. Cl. ...................................... 452/187; 452/185
(58) Field of Search .......................... 452/187, 185, 452/190, 191

(56) References Cited

U.S. PATENT DOCUMENTS

| | | |
|---|---|---|
| 3,854,168 A | 12/1974 | Bradley |
| 5,562,534 A | 10/1996 | Mcgough |
| 5,820,455 A | 10/1998 | Breedlove |
| 6,045,442 A | 4/2000 | Bounds |
| 6,062,974 A | 5/2000 | Williams |
| 6,202,868 B1 | 3/2001 | Murray |

*Primary Examiner*—Charles T. Jordan
*Assistant Examiner*—Judith A. Nelson

(57) ABSTRACT

The invention is a portable game hoist (12) designed for suspending large animals such as deer, hogs, and the like from a tree, pole, or post for immediate processing in the field. The game hoist consists of a vertical support member (16) connected at an obtuse angle to a horizontal lifting arm (14) via a main bracket (18c), a hand winch (24a) for lifting the animal, and a means of attaching the hoist to a tree. The hoist is lightweight, yet sturdy and simple to use. The game hoist can be easily folded for transportation or storage by removing a removable bolt or ball pin (30). Tightening up on the hand winch secures the game hoist in the folded position. In the folded position, the game hoist can be transported under the seat of a truck, on the rack of a four-wheeler, or in the bottom of a boat. The hoist can also be carried by hand or across the shoulder using a chain (20). A companion to assist in the use of the game hoist is not necessary, as it is light in weight and simple to use.

18 Claims, 7 Drawing Sheets

"TREE WINCH" PORTABLE GAME HOIST

CROSS-REFERENCE TO RELATED APPLICATION

This application is entitled to the benefit of Provisional Patent Application Ser. No. 60/423,124 filed Nov. 1, 2002.

FEDERALLY SPONSORED RESEARCH

Not Applicable

SEQUENCE LISTING OR PROGRAM

Not Applicable

BACKGROUND OF THE INVENTION

1. Field of Invention

The invention relates to wild game hoists, more specifically, those hoists that are lightweight, portable, and easily used in the field for the immediate dressing of wild game.

2. Background of the Invention

Hunters often fell their game in remote areas. The meat, if not quickly processed and cooled, can spoil. Therefore, there is a need for a device that will allow one to quickly and easily raise the animal above dirt and debris for processing in the field. Hunters often carry with them, besides their weapon, extra clothing, camping equipment, and devices that might aid them in their pursuit of wild game. Therefore, it is important that any game hoist be light in weight, compact, and easily transported by the hunter.

The portable game-hoisting devices available to hunters are one of three types. The first being those that are designed to be mounted to a vehicle such as a truck or a four-wheeler. U.S Pat. Nos. 4,806,063; 5,662,451; 5,791,858; 5,975,831; 6,109,855; 6,138,991; 6,152,175; 6,155,771; and 6,250,483 are all examples of this type of game hoist as are U.S. patent application Ser. Nos. 2001/0043852 A1; 2002/0045417 A1; 2002/0168258 A1; 2003/0000906 A1; and 2002/0173262. These types of hoist are of no value to the hunter unless a vehicle is readily available, thus limiting its use to only those areas accessible by vehicle. Many hunters do not have the luxury of affording off-road vehicles of the type necessary to reach remote areas. Also, many state, nationally, and privately owned lands do not permit use of off-road vehicles.

The second being those hoists that are free standing. U.S. Pat. Nos. 4,997,152 and 5,211,601 are examples of free-standing game hoists. This type of hoist must be sufficient in size and strength to lift a large game animal, such as a deer, to a height of seven feet or more. For this reason, the freestanding hoist is bulky and cumbersome for the hunter to carry into the woods.

The third being those that are dependent upon a natural object, such as a tree, for functionality. U.S. Pat. Nos. 5,395,284; 5,417,609; 3,854,168; 5,562,534; 5,820,455; 6,045,442; 5,049,110, and 6,062,974 are examples of this type of game hoist.

U.S. Pat. Nos. 5,395,284 to Frisk and 5,417,609 to Oldham are examples of game hoist that are suspended from an overhead limb by a J-hook. Overhanging limbs of a height and strength suitable for the suspension of game can sometimes be difficult to find. Also, devices of this design have a tendency to swing and be difficult to steady while being used.

U.S. Pat. No. 3,854,168 to Bradley attaches to a tree by a chain at the top. The bottom of the hoist consists of a set of teeth that are held against the tree by the weight of the animal. The user must take special precautions to assure that the bottom teeth bite the tree sufficiently enough to prevent slippage, as there is no strap to secure the bottom. Also, if the top is mounted too close to the tree, the weight of the animal being hoisted could cause the hoist to slide down the tree.

U.S. Pat. No. 5,562,534 to McGough is a portable game hoist and skinning aid. The hoist is secured to a tree by straps. There are no teeth or cleats to prevent slippage and side-to-side movement. McGough's invention is non-folding and non-collapsible making it less portable.

U.S. Pat. No. 5,820,455 to Breedlove is a portable game hoist comprising a vertical member connected to a horizontal member by a bracket and a pair of diagonal braces that provide support. Disassembly of the invention for transportation requires removal of the diagonal braces at one end. The top and bottom cross members, used to prevent slippage and provide lateral stabilization, are bulky and add to the weight of the apparatus. The apparatus must be assembled at the tree, which makes the process cumbersome.

U.S. Pat. No. 6,045,442 to Bounds is a game hoist for suspending large animals in a stable position for cleaning in the field. Bounds's hoist consists of two vertical members, two horizontal members, a diagonal member, and a gambrel device, which is also attached to a vertical member. Bounds's invention, which is not collapsible, is large in size and would be difficult for a hunter to pack into the woods.

U.S. Pat. No. 5,049,110 to Owens refers to a frame with two legs that pass around the trunk of the tree, a connector bar that engages the front of the tree, and a V-shaped bar that is connected to the hoist after it has been placed around the tree. Owens' hoist is rigid, bulky, and non-foldable, which makes it less portable and more cumbersome for the hunter to transport into the woods.

U.S. Pat. No. 6,062,974 to Williams is a portable game hoist consisting of a diagonal support brace pivotally attached to a horizontal member. The horizontal member is attached to a tree by a chain, and the vertical member is equipped with two prongs designed to penetrate the tree to prevent slippage and provide support to the horizontal member. The problem with Williams' device is that the bottom prongs are only held in place by the weight of the load. There is no strap to prevent slippage of the diagonal piece should the invention be bumped while being loaded. Williams's device is susceptible to lateral movement, as there is nothing in the design to prevent such movement.

BACKGROUND OF THE INVENTION—OBJECTS AND ADVANTAGES

Accordingly, several objects and advantages of my portable game hoist are:

(a) to provide a portable game hoist that folds for storage and unfolds for use without disassembling the device;

(b) to provide a portable game hoist that does not have to be bound in the closed position;

(c) to provide a portable, foldable game hoist that in the closed position can be carried across the hunter's shoulder freeing the hunter's hands for other tasks;

(d) to provide a portable, foldable game hoist that can be mounted to a tree in the open or closed position;

(e) to provide a portable game hoist that can be mounted to a tree from the left or right side using the same method;

(f) to provide a portable, foldable game hoist that can be folded into the closed position after usage while mounted to a tree, pole, or post;

(g) to provide a portable game hoist that in the closed position is void of loose parts that might make noise while being carried into the woods;

(h) to provide a game hoist that is not dependent on a vehicle for usage;

Further objects and advantages of my portable game hoist will become apparent from a consideration of the drawings and ensuing description.

SUMMARY

These and other objects and advantages of my game hoist are accomplished in accordance with the principles of the invention by providing a game hoist that is both portable and foldable. A winch is attached to the lower end of a vertical support member. A main bracket is attached to the upper end of the vertical member. A horizontal lifting arm is pivotally attached inside the main bracket. At the end of the horizontal lifting arm opposite the main bracket is a front bracket. A nylon strap is attached to the winch. This strap extends up and across a nylon bushing mounted inside the main bracket and then continues across a second nylon bushing mounted inside the front bracket. The apparatus has two hooks mounted to the top of the main bracket. These hooks are used to secure the invention to a tree, pole, or post with a chain.

My game hoist allows the hunter to suspend the game animal above the ground. This permits the hunter full access to the animal and requires only a tree, pole, or post for full function.

When not in use, my game hoist can be readily folded by removing a single pin and rotating the horizontal lifting arm down until it is parallel or near parallel to the vertical support member. By tightening the winch the hoist can then be secured in the folded position. The end of the horizontal lifting arm opposite the main bracket rests inside the drum of the winch. There is no need to take extra steps to bind the game hoist in the closed position.

In the folded position, my game hoist can be carried across the hunter's shoulder freeing the hands for other tasks. This is accomplished by hooking the chain into the karabiner at one end and the removable pin at the other. The chain is then used as a sling to carry the invention.

BRIEF DESCRIPTIONS OF DRAWINGS

DESCRIPTION OF THE PREFERRED EMBODIMENT

Figure 2:
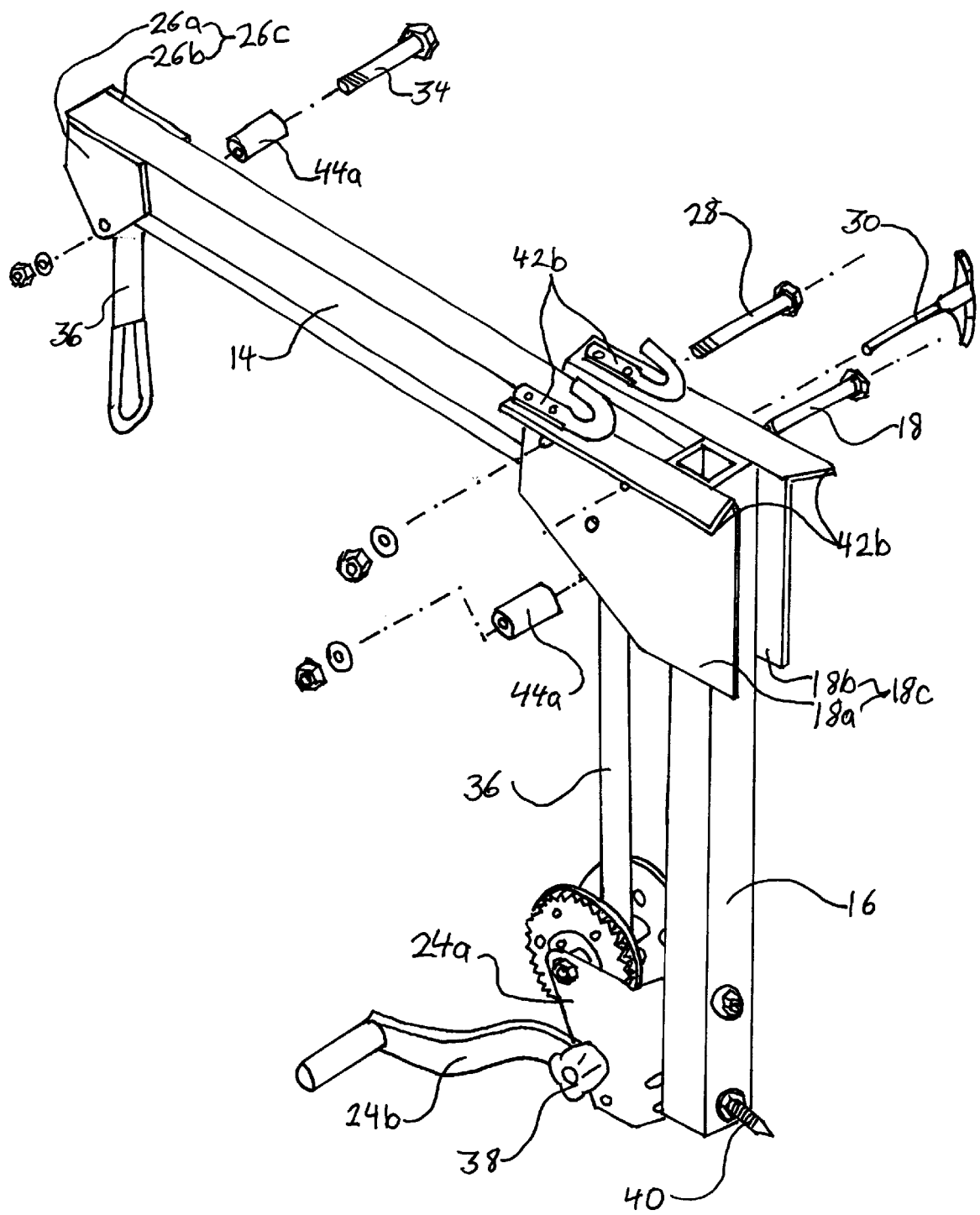
FIG. 2 shows an exploded view of the portable game hoist in the open position.

With reference to FIG. 2, a portable game hoist 12 includes a vertical support member 16, which is rigidly attached between a left half main bracket 18a and a right half main bracket 18b, which together make up a main bracket 18c. A horizontal lifting arm 14 is pivotally attached inside the main bracket 18c with a pivot bolt 28 and a removable bolt or ball pin 30. Rigidly affixed to the end of horizontal lifting arm 14 distal vertical support member 16 is a left half front bracket 26a and a right half front bracket 26b, which make up a front bracket 26c. A hand winch 24a is rigidly attached to the lower end of vertical support member 16. A molded removable winch knob 38 secures a curved winch handle 24b to hand winch 24a.

Figure 1:
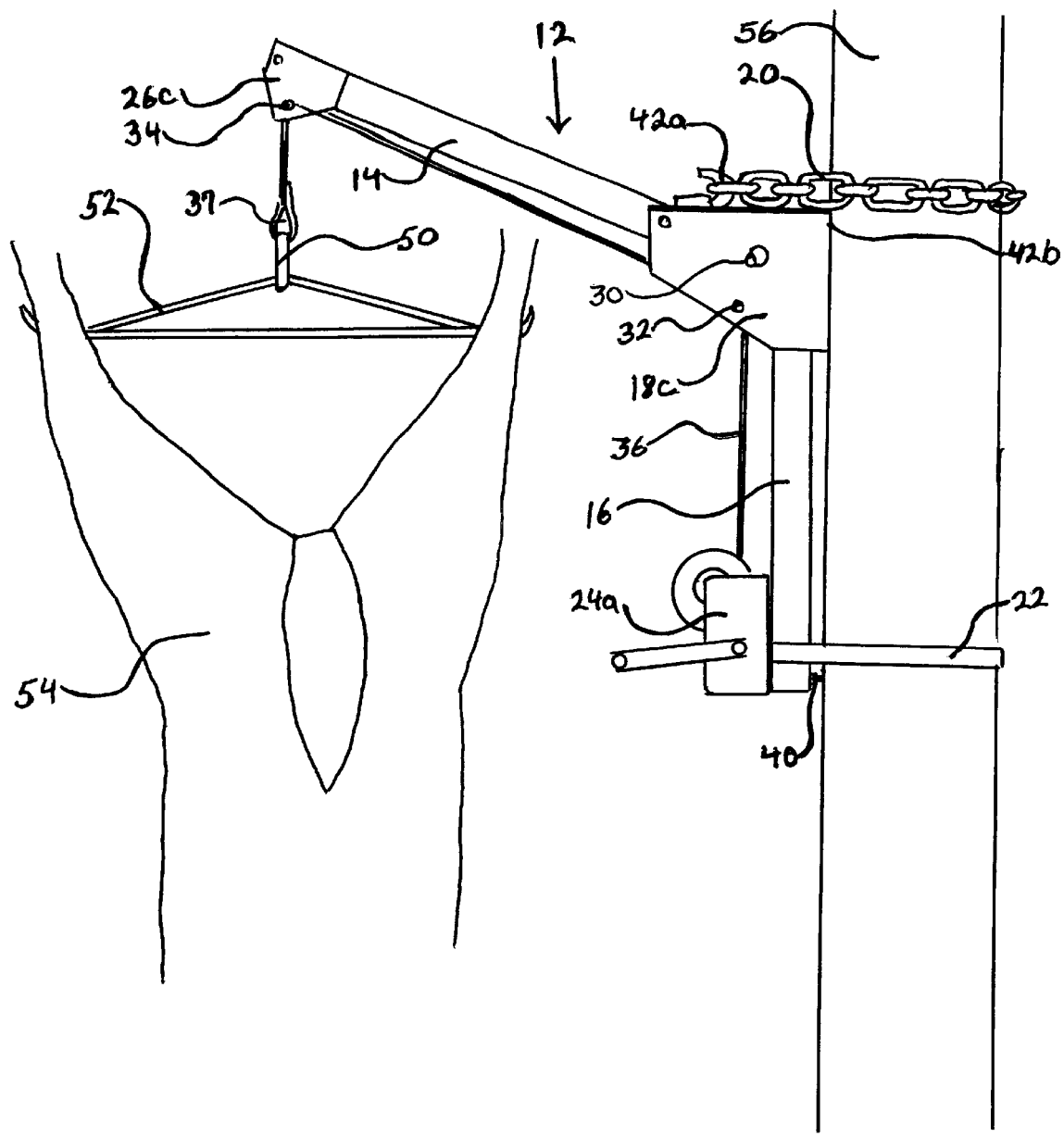
FIG. 1 shows side view of the portable game hoist mounted to a tree, pole, or post with a deer carcass attached.

Referring to FIG. 1, a hoist line 36 is attached to hand winch 24a and extends inside main bracket 18c and is supported by an inner axle bolt 32. Hoist line 36 further extends between front bracket 26c and is supported by an outer axle bolt 34. A gambrel 52 is attached to the end of hoist line 36 opposite hand winch 24a by a karabiner or steel hook 50. A deer carcass 54 is attached to gambrel 52.

Continuing with FIG. 1, portable game hoist 12 is secured to a tree, pole, or post 56 at the top by a chain 20. Chain 20 is looped into a pair of mounting hooks 42a located on top of main bracket 18c. The end of main bracket 18c, distal horizontal support arm 14, serves as cleats 42b. Cleats 42b prevent the hoist from sliding down the tree. Portable game hoist 12 is further secured to the tree, pole, or post 56 at the bottom by a cinch strap 22. A pointed bolt 40, used to secure hand winch 24a to vertical support member 16, extends through vertical support member 16. Pointed bolt 40 serves to penetrate tree, pole, or post 56 and further prevent slippage.

Figure 4:
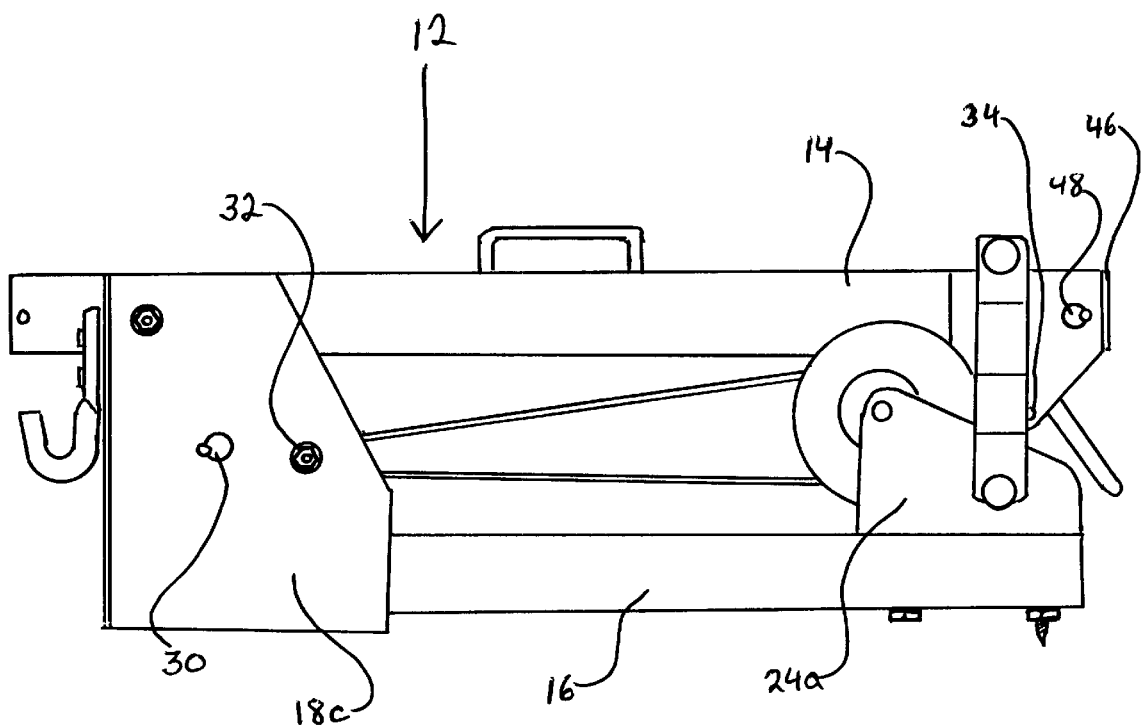
FIG. 4 shows side view of portable game hoist in the closed position.

As shown in FIG. 4, the portable game hoist 12 can be folded by removing a removable bolt or ball pin 30. Horizontal lifting arm 14 is then rotated so that the end distal main bracket 18c rest inside the drum of hand winch 24a. A ball pin 48 and a removable plug 46 can be removed. The chain can then be stored inside horizontal lifting arm 14.

DRAWINGS—Reference Numerals

(12) portable game hoist
(14) horizontal lifting arm
(16) vertical support member
(18a) left half main bracket
(18b) right half main bracket
(18c) main bracket
(20) chain
(22) cinch strap
(24a) hand winch
(24b) curved winch handle
(26a) left half front bracket
(26b) right half front bracket
(26c) front bracket
(28) pivot bolt
(30) removable bolt or ball pin
(32) inner axle bolt
(34) outer axle bolt
(36) hoist line
(37) lifting eye
(38) molded removable winch knob
(40) pointed bolt
(42a) mounting hooks
(42b) cleats
(43) mounting slot
(44a) bushing (44b) pulley
(46) removable end plug
(48) ball pin
(50) karabiner or steel hook
(52) gambrel
(54) deer carcass
(56) tree, pole, or post

CONSTRUCTION OF THE INVENTION

Portable game hoist 12 is constructed of a lightweight alloy, preferably aluminum. Referring to FIG. 2 the main body of portable game hoist 12 consists of two pieces of aluminum tubing, vertical support member 16, and horizontal lifting arm 14, connected perpendicular or near perpendicular to each other by main bracket 18c.

Main bracket 18c serves five purposes. First, main bracket 1&c serves as a support mechanism for horizontal lifting arm 14. Second, the design of main bracket 18c provides a pair of cleats 42b. Cleats 42b prevents portable game hoist 12 from sliding down tree. Third, main bracket 18c serves to provide a pivot point on which horizontal lifting arm 14 can be folded for storage. Fourth, main bracket 18c serves as an anchor for inner axle bolt 32. Finally, main bracket 18c provides an anchor point for mounting hooks 42a used to anchor portable game hoist 12 to the tree.

Still referring to FIG. 2, main bracket 18c is made up of two unequal angles identified as left half main bracket 18a and right half main bracket 18b. Left half main bracket 18a and right half main bracket 18b are rigidly attached on opposite sides of the top end of vertical support member 16. Horizontal lifting arm 14 is pivotally attached to main bracket 18c by pivot bolt 28 and removable bolt or ball pin 30. Pivot bolt 28 is located near the end of main bracket 18c distal from vertical support member 16. Removable bolt or ball pin 30 is located between pivot bolt 28 and vertical support member 16. Inner axle bolt 32 is located in main bracket 18c inside the point where vertical support member 16 and horizontal lifting arm 14 meets. Rigidly attached to opposite sides of horizontal lifting arm 14, distal main bracket 18c are a left half front bracket 26a and a right half front bracket 26b, which together form a front bracket 26c. Outer axel bolt 34 is located in front bracket 26c. A bushing 44a is used on the outer and inner axel to prevent wear of the nylon strap used as hoist line 36.

Referring to FIG. 1 hand winch 24a is rigidly attached to the lower end of vertical support member 16 on the same side as horizontal lifting arm 14. Attached to hand winch 24a is hoist line 36 with a lifting eye 37. Hoist line 36 extends over inner axle bolt 32 and further extends over and beyond outer axle bolt 34. Gambrel 52 is readily attached to the end of hoist line 36 via karabiner or steel hook 50. Hand winch 24a is secured at the bottom by pointed bolt 40. Pointed bolt 40 is used to steady the hoist, once on the tree.

Rigidly attached to either side of the top surface of main bracket 18c is mounting hooks 42a. Mounting hooks 42a are located a short distance behind cleats 42b.

OPERATION OF THE INVENTION

Figure 3:
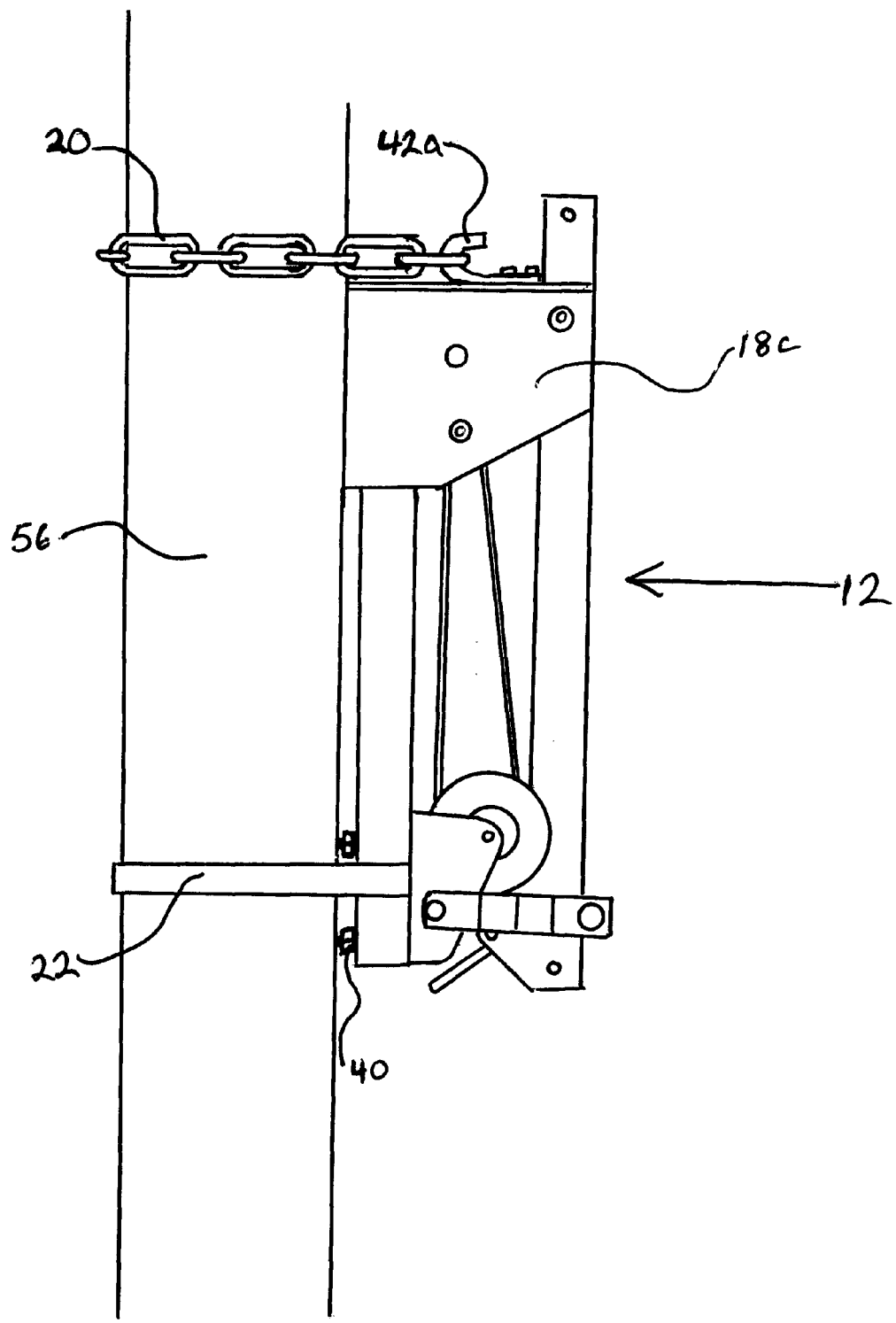
FIG. 3 shows side view of the portable game hoist in the folded position mounted to a tree pole, or post.

With reference to FIG. 3, hold portable game hoist 12 perpendicular to tree, pole, or post 56. Place a loop of chain 20 over one of mounting hooks 42a. Wrap chain 20 around tree, pole, or post 56, removing all possible slack and then place chain 20 onto remaining mounting hook 42a. Pull down on the opposite end of the game hoist until pointed bolt 40 makes contact with tree, pole, or post 56. Secure the bottom of portable game hoist 12 to tree, pole, or post 56 with cinch strap 22.

With reference to FIG. 1, unlock hand winch 24a. Remove removable bolt or ball pin 30 and raise horizontal lifting arm 14 until perpendicular or greater than perpendicular to vertical support member 16. Replace removable bolt or ball pin 30, thus securing horizontal lifting arm 14 in the working position. Pull hoist line 36 down to the desired height. Lock hand winch 24a. Attach loaded gambrel 52 to hoist line 36 via karabiner or steel hook 50. Using hand winch 24a, raise load to the desired height.

Referring to FIG. 4, portable game hoist 12 is in the folded position. There is no need to apply any devices to secure portable game hoist 12 in the folded position. Because of the location of inner axle bolt 32 and outer axle bolt 34, portable game hoist 12 can be secured in the folded position by simply tightening hand winch 24a.

Still referring to FIG. 4, when not in use, ball pin 48 and removable end plug 46 are removed and the chain is stored inside horizontal lifting arm 14.

Figure 5:
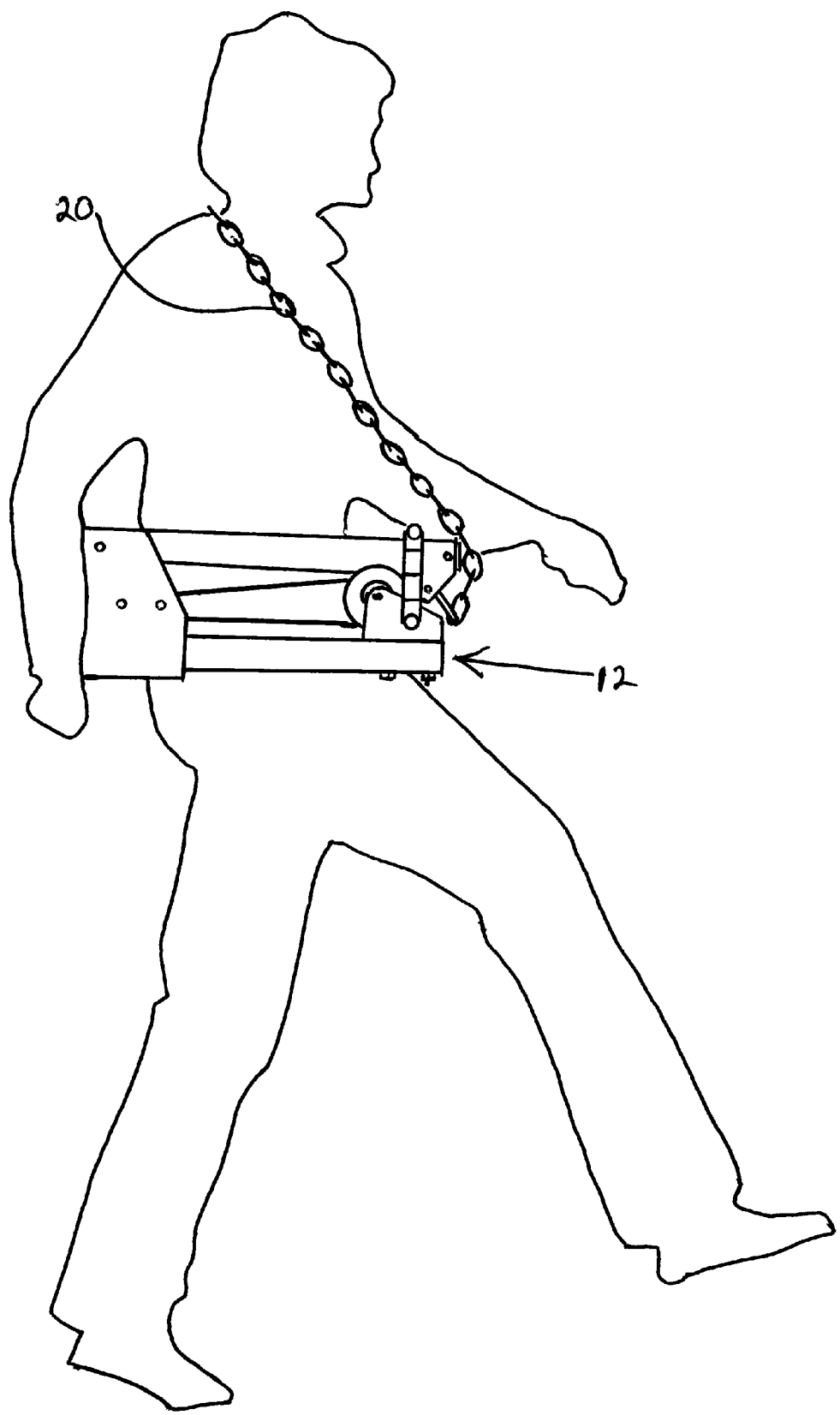
FIG. 5 shows view of the portable game hoist in the folded position being carried across the hunter's shoulder.

FIG. 5 shows portable game hoist 12 being carried across the hunter's shoulder using chain 20 as a sling.

DESCRIPTION AND OPERATION OF ALTERNATIVE EMBODIMENTS

In the Construction of the Invention section, main bracket 18c is identified as being constructed out of two pieces of unequal angle. Let it be noted that someone skilled in the art might construct the main bracket 18c from a piece of material other than unequal angle such as channel, flat plate, equal angle, or other shapes that might provide the same results. Though unequal angle is preferred, it is recognized that it is not the only material that will accomplish the desired results.

Figure 6:
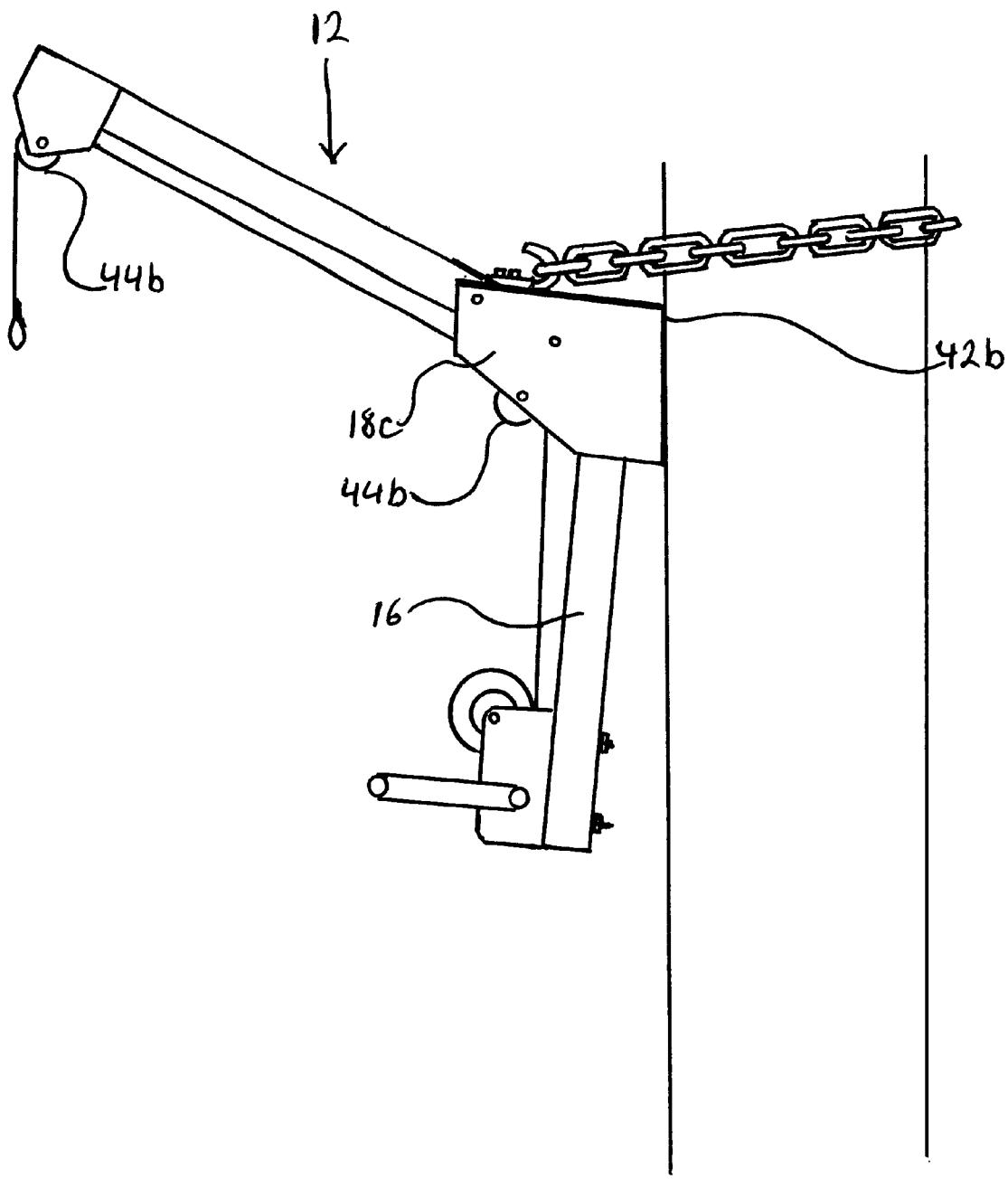
FIG. 6 shows side view of the portable game hoist, with a mitered main bracket, mounted to a tree, pole, or post.

Also, the end of main bracket 18c that serves as the cleats 42b can be made several ways. FIG. 1 shows main bracket 18c with a square cut on the end that serves as cleats 42b. While FIG. 6 shows main bracket 18c with a mitered cut on the end that serves as cleats 42b. The mitered cut angles vertical support member 16 away from the tree. This eliminates stress on the vertical member created by lifting heavy loads.

FIG. 6 also shows a pulley 44b located on the inner and outer axels to prevent wear should a rope or cable be used as hoist line 36.

Figure 7:
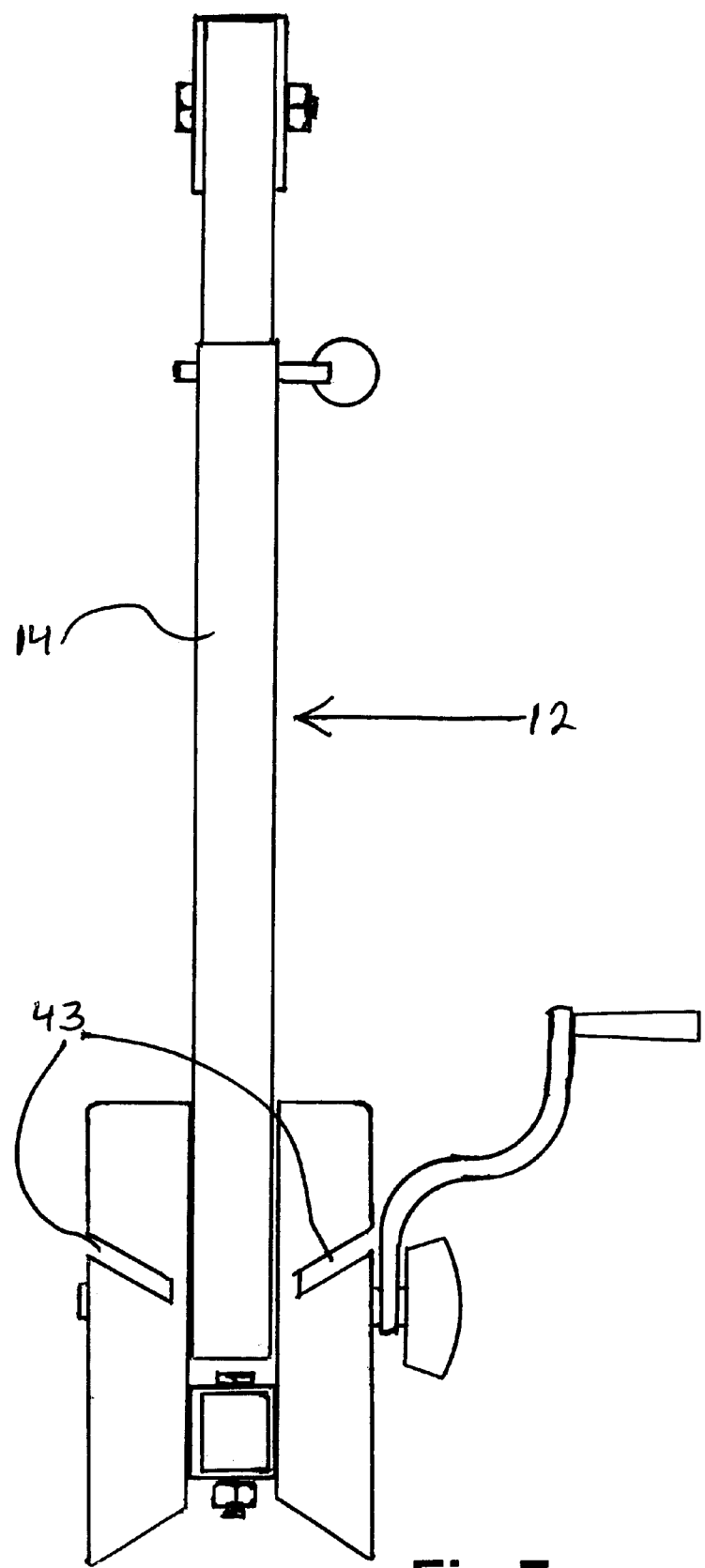
FIG. 7 shows top view of the portable game hoist with telescoping horizontal lifting arm.

As shown in FIG. 7 the horizontal lifting arm 14 can be made of two telescoping pieces. This would allow the hoist more reach in the working position.

FIG. 7 also shows a mounting slot 43 cut into top of main bracket 18c. Making an angled cut in top of main bracket 18c makes mounting slot 43. The slot angles back towards the cleats 42b. The slots serve the same function as mounting hooks 42a.

In the Construction of the Invention section, portable game hoist 12 is constructed out of aluminum. Portable game hoist 12 can also be constructed from a selection of materials consisting of, but not limited to metal, metal alloy, carbon-graphite, fiberglass, epoxy, wood, wood composites, plastic, and plastic composites.

Portable game hoist 12 is intended to be used as a portable lifting device for hoisting deer, hogs, and the like in the field for immediate processing. It should also be noted that portable game hoist 12 can be used for many other lifting jobs including but not limited to lifting a four-wheeler to change a tire, lifting a lawn-mower to change a blade or tire, or raising a heavy object so that a truck, trailer, or four-wheeler may be backed underneath it for loading. The hoist can be made to lift heavier objects.

The main body, vertical support member 16, horizontal lifting arm 14 and main bracket 18c, can be adapted to other mounting devices. The invention could then be mounted for use in vehicles or atop platforms such as building, decks, or towers.

Though a hand winch 24a is preferred for the designed use, an electric winch can be substituted to perform more demanding jobs. Hoist line 36 can be selected from a selection of materials consisting of but not limited to rope, steel rope, and nylon strap.

What is claimed is:

1. A portable, collapsible hoisting device, being in the open and closed positions, used for hoisting deer and game animals in the field for immediate processing, the structure comprising;
   A. a vertical support member having an upper and lower end
   B. a hand winch rigidly attached to the lower end of said vertical support member
   C. a main bracket rigidly attached to the upper end of said vertical support member
   D. a horizontal lifting arm having ends distal and proximal to said vertical support member, pivotally attached to said main bracket
   E. a front bracket rigidly affixed to the distal end of said horizontal lifting arm
   F. an outer axle bolt secured through said front bracket
   G. an inner axle bolt secured through said main bracket
   H. said horizontal lifting arm in the open position and a means of readily securing the lifting arm in the open position
   I. a hoist line attached to said hand winch at one end and continuing over the inner and outer axle bolts at the other end
   J. a lifting eye at the end of said hoist line opposite said winch and a means of securing said lifting eye to the object to be lifted.

2. The game hoist of claim 1, further including a cinch strap at the bottom of said vertical support member to help secure the structure to said tree, pole of post.

3. The game hoist of claim 1, further including a chain, a pair of mounting hooks, and a means of securing the hoist to a tree, pole, or post using said chain and said mounting hooks.

4. The game hoist of claim 1, further including said chain, a mitered mounting slot cut in top of main bracket, and a means of securing the hoist to the tree using said chain and said mounting slot cut into said main bracket.

5. The game hoist of claim 1, further including said horizontal lifting arm formed of telescoping members as to increase the reach of the horizontal arm.

6. The game hoist of claim 1, further including a winch handle with an exaggerated offset as to prevent contact between said tree, pole, or post and said winch handle.

7. The game hoist of claim 1, further including a removable knob on the winch to allow for removal of said winch handle for storage.

8. The game hoist of claim 1, further including said chain and a method of storing said chain inside the vertical member.

9. The game hoist of claim 1, further including said chain and a method of storing said chain inside the horizontal arm.

10. The game hoist of claim 1, further including a gambrel and a means of attaching said gambrel to said lifting eye.

11. The game hoist of claim 1, whereas said horizontal lifting arm and said vertical support members are manufactured from a material selected from a group consisting of metal, metal alloy, carbon-graphite, fiberglass, epoxy, wood, wood composite, plastic and plastic composite.

12. The game hoist of claim 1, further including said inner axel bolt and said outer axel bolt having a bushing to prevent wear of said hoist line.

13. The game hoist of claim 1, further including said inner axel bolt and said outer axel bolt having a pulley to prevent wear of said hoist line.

14. The game hoist of claim 1, whereas said main bracket is manufactured from a material selected form a group consisting of metal, metal alloy, carbongraphite, fiberglass, epoxy, wood, wood composite, plastic and plastic composite.

15. The game hoist of claim 1, whereas the relationship between the location of the inner and outer axel bolts, said pivot bolt and the winch allow the invention to be secured in the closed position by tightening the winch.

16. The game hoist of claim 1, further including a handle rigidly attached to the top of said horizontal lifting arm for carrying the invention.

17. A method of securing the game hoist of claim 1 in the closed position comprising the following steps:
   A. removing said removable bolt or ball pin and pivoting said horizontal lifting arm on said pivot bolt until distal end of the horizontal arm rests inside the drum of said hand winch parallel or near parallel to said vertical support member
   B. securing the invention in the closed position by tightening said hand winch.

18. A main bracket that provides the following functions:
   A. support for said horizontal lifting arm
   B. a pair of cleats that prevent the invention from sliding down the tree
   C. an anchor point for said chain
   D. a pivot point on which said horizontal support member can be folded
   E. an anchor point on which the horizontal support member can be readily secured in the open position.

* * * * *